(12) United States Patent
Di Castri et al.

(10) Patent No.: US 11,161,588 B2
(45) Date of Patent: Nov. 2, 2021

(54) HELICOPTER

(71) Applicant: LEONARDO S.P.A., Rome (IT)

(72) Inventors: Mimmo Di Castri, Samarate (IT); Federico Campera, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 16/768,755

(22) PCT Filed: Dec. 19, 2018

(86) PCT No.: PCT/IB2018/060372
§ 371 (c)(1),
(2) Date: Jun. 1, 2020

(87) PCT Pub. No.: WO2019/123334
PCT Pub. Date: Jun. 27, 2019

(65) Prior Publication Data
US 2021/0171183 A1    Jun. 10, 2021

(30) Foreign Application Priority Data
Dec. 19, 2017    (EP) .................................. 17208693

(51) Int. Cl.
*B64C 1/32*    (2006.01)
*B64C 27/04*   (2006.01)
*B64C 1/14*    (2006.01)

(52) U.S. Cl.
CPC ............... *B64C 1/32* (2013.01); *B64C 27/04* (2013.01); *B64C 1/1492* (2013.01)

(58) Field of Classification Search
CPC ........... B64C 1/14; B64C 1/32; B64C 1/1484; B64C 1/1492; B60J 10/70; B60J 10/365
See application file for complete search history.

(56) References Cited

U.S. PATENT DOCUMENTS 2,655,239 A * 10/1953 Kenlock ................. F16B 5/121
                                                     52/204.597
3,604,171 A *  9/1971 Perilstein .............. E06B 3/6205
                                                     52/204.597
5,806,257 A    9/1998 Gerd et al.
(Continued)

FOREIGN PATENT DOCUMENTS

DE          916 501          8/1954
EP          0 249 560        12/1987

*Primary Examiner* — Richard G Davis
(74) *Attorney, Agent, or Firm* — Leason Ellis LLP (57) ABSTRACT

An emergency exit for a helicopter is described that comprises: a wall defining an opening; a removable part engaging the opening in a removable manner; and a seal interposed between the wall and the removable part. The seal is transformable between: a first configuration, in which it prevents removal of the removable part from the wall following application of a predetermined load on the removable part; and a second configuration, in which it allows removal of the removable part from the wall following application of the predetermined load on the removable part. The emergency exit comprises an insert interposed between the seal and the wall; at least one of the insert and the seal comprise at least one tooth engaging a recess with a shape corresponding to the tooth and defined by the other of the insert and said seal, when the seal keeps, in use, the removable part constrained to wall.

9 Claims, 5 Drawing Sheets

(56) References Cited

U.S. PATENT DOCUMENTS

2008/0096003 A1* 4/2008 Dragon .............. B29C 66/1142
                                                    428/313.5
2012/0248713 A1* 10/2012 Raspic ................. B60J 10/365
                                                    277/630

* cited by examiner

HELICOPTER

CROSS-REFERENCE TO RELATED APPLICATIONS

This patent application is a U.S. National Phase Application under 35 U.S.C. § 371 of International Patent Application No. PCT/IB2018/060372, filed on Dec. 19, 2018, which claims priority from European patent application no. 17208693.6 filed on Dec. 19, 2017, all of which are incorporated by reference, as if expressly set forth in their respective entireties herein.

TECHNICAL FIELD

The present invention relates to an emergency exit for a helicopter.

BACKGROUND ART

In known types of helicopters, it is necessary to provide emergency exits to allow the occupants to quickly abandon the helicopter, for example in the case of an accident.

In some of the known solutions, the normal service exits of the helicopter can also be used as emergency exits.

In further known solutions, windows sufficiently large enough to allow a person to climb through are used as emergency exits.

According to these further solutions, the emergency exits basically comprise:
  a hatch made in the fuselage of the helicopter and defining an opening;
  a removable part, in particular transparent, housed inside the opening; and
  a seal interposed between the hatch and the removable part.

Under normal helicopter operating conditions, emergency exits must ensure that the removable part not be removed either by aerodynamic suction or compression loads acting on the surface of this removable part facing the outside of the helicopter or by accidental loads that might be applied on the surface facing the inside of the helicopter.

Contrariwise, in the event of an emergency, the emergency exits must allow the occupants inside the fuselage to quickly remove the removable part from the hatch.

More specifically, it must be possible to remove the removable part by applying a force on it that does not exceed a predetermined value, equal to 25 kg. It must be possible to apply this force from both the inside and outside of the fuselage.

In order to ensure these requirements are met, there are known emergency exits, as in U.S. Pat. No. 8,826,597 for example, in which the seal is glued continuously to the removable part and discontinuously to the hatch.

More specifically, the seal is made of an elastically deformable material and has a pair of seats engageable by respective strips connected to respective selectively activatable extraction elements, such as cords for example.

When the seats are engaged in the strips, the seal is arranged in a first configuration in which it prevents removal of the removable part following application of the predetermined load value. This happens because the seal is elastically deformable and the overall resistive section is equal to the sum of the section of the seal and the sections of the strips.

Conversely, when the strips are removed by operating the extraction element, the seal becomes arranged, for elastic deformation, in a second configuration, in which it allows of the removable part following application of the predetermined load. This happens because the only resistive section is that of the seal when the latter is arranged in the second configuration, following removal of the strips.

In the event of an emergency, removal of the removable part from the hatch takes place in two steps, starting from a state in which the strips engage the seats of the seal so as to keep the latter in the first configuration and to prevent accidental removal of the removable part.

First of all, at least one of the strips are removed from the seal by acting on the extraction element, so as transform the seal from the first configuration to the second configuration.

Then, the removable part is removed from the hatch, together with the seal, by exerting the predetermined load on a corner of the removable part.

In this solution, the load effectively necessary to enable removal of the removable part when the seal is in the second configuration corresponds to the load necessary to overcome the resistance of the glue interposed between the seal and the hatch.

The applicant has observed that the presence of the glue joint makes it difficult to control the force necessary to remove the removable part from the hatch with precision and repeatability.

In fact, an excess of glue could raise this force value too much, making removal of the removable part difficult in an emergency.

Conversely, too meagre an amount of glue could leave the possibility of small movements and vibrations of the removable part during helicopter flight.

There is thus a perceived need to make the amount of force necessary to remove the removable part as repeatable and controllable as possible.

There is also a perceived need make the amount of force necessary to remove the removable part as independent as possible from the operations of connecting the seal to the wall by the personnel who perform these operations.

There is also a perceived need to reduce the amount of force necessary to remove the removable part, at the same time ensuring the removable part is able to support the aerodynamic loads that are generated in the more critical aerodynamic manoeuvres.

There is also a perceived need in the industry to produce the emergency exit in the simplest manner possible, whilst requiring the least possible use of qualified technical personnel and/or special equipment.

There is also a perceived need in the industry to be able to apply the seal to the emergency exits of helicopters that are already manufactured and in service in a simple and inexpensive manner.

There is also a perceived need to ensure that the aforementioned amount of force necessary to remove the removable part remains constant over a wide range of temperature values, from −40° C. to 50° C., unlike the known and previously described solutions. In fact, the mechanical resistance characteristics of glue joints vary significantly over the above-defined temperature range.

There is also a perceived need to reduce as far as possible the cost and/or overall weight of the emergency exit.

FR-A-3003811 describes an emergency exit for a helicopter.

U.S. Pat. No. 5,806,257 describes an exit for a motor-vehicle comprising a wall defining an opening, a glass panel engaging the opening and a seal interposed glued to the glass panel. The exit also comprises an adhesive composition glued to the wall and introduced in a U-shaped channel depression defined by the seal. The adhesive composition comprises a plurality of teeth and recesses engaging respective recesses and teeth defined by the seal.

DISCLOSURE OF INVENTION

The object of the present invention is to produce a helicopter with an emergency exit that enables satisfying at least one of the aforementioned needs in a simple and inexpensive manner.

The above-stated object is achieved by the present invention, in so far as it relates to a helicopter, according to claim 1.

BRIEF DESCRIPTION OF THE DRAWINGS

For a better understanding of the present invention a preferred embodiment is described hereinafter, purely by way of a non-limitative example and with reference to the accompanying drawings, in which.

BEST MODE FOR CARRYING OUT THE INVENTION

Figure 1:
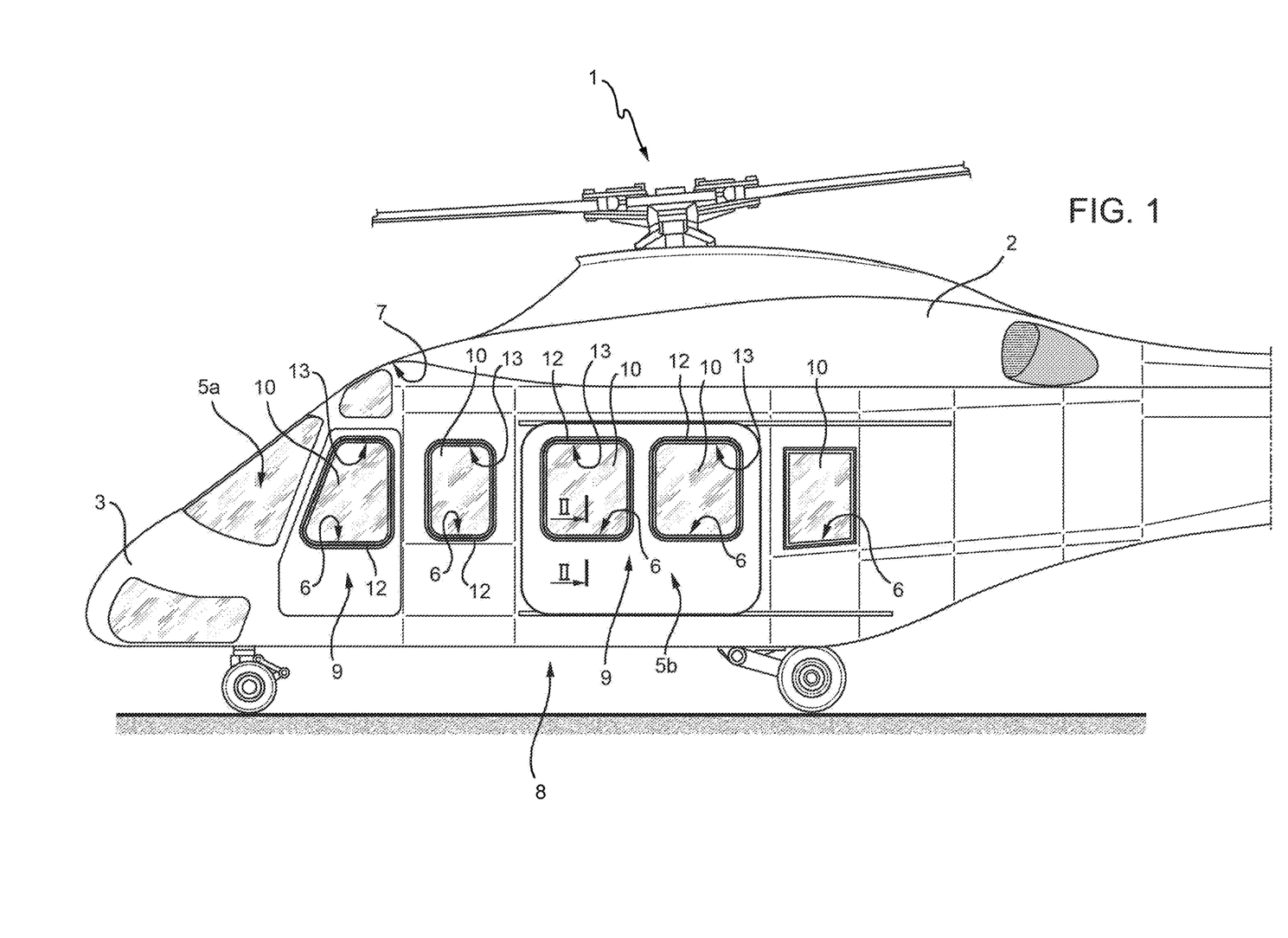
FIG. 1 is a side view of a helicopter comprising an emergency exit according to the invention.

Referring to FIG. 1, reference numeral 1 indicates a helicopter. The helicopter 1 basically comprises a fuselage 2 with a nose 3, a main rotor rotating about an axis and a tail rotor located at one end of the fuselage 2 and rotating about its own axis, transversal to the axis of the main rotor.

The fuselage 2 in turn comprises a plurality of emergency exits 5a and 5b which allow the occupants of the helicopter 1 to promptly abandon the helicopter 1 in case of necessity.

In particular, the emergency exit 5a is located in a cabin 7 intended to be occupied by the pilot and possibly the co-pilot of the helicopter 1.

The emergency exits 5b are located on a portion 8 of the fuselage intended to be used by the occupants of the fuselage 2.

In this description, only a single emergency exit 5b will be described hereunder, as the method of operation is identical for all emergency exits 5a and 5b.

The emergency exit 5b comprises, in particular:
a wall 9 defining an opening 6;
a removable part 10 engaging the opening 6 in a removable manner; and
a seal 12 interposed between the wall 9 and the part 10.

The wall 9 can be made integrally with the fuselage 2, connected to the fuselage 2 or hinged to the fuselage 2, depending on the constructional requirements of the emergency exit 5b.

The part 10 has a closed profile 13, rectangular in shape and with sides connected at the vertices in the case shown.

Preferably, the part 10 is made of glass. Alternatively, the part 10 is made of plastic, in particular polycarbonate or acrylic.

The area of the part 10 is sufficient to allow the occupants of the helicopter 1 to climb through and thus escape.

In one embodiment that is not shown, the part 10 could be opaque.

The seal 12 has a shape corresponding to that of the part 10 and has a main extension following a closed path P.

As visible in FIGS. 2 to 5, the seal 12 is coupled to the part 10 in a fixed manner and coupled to the hatch 9 in a removable manner.

In order to obtain the necessary certification, the emergency exit 5b must ensure that, in normal operating conditions of the helicopter 1, the part 10 is held in place by the wall 9 following application of a force even higher than a threshold value, for example 20 kg.

In this way, it is ensured that, in normal operating conditions of the helicopter 1, normal loads from the inside and aerodynamic loads from the outside do not cause removal of the part 10.

Contrariwise, in emergency situations, the emergency exit 5b must ensure that the part 10 is removable from the wall 9 by the application of a force lower than the aforementioned threshold value.

This force can be applied from inside the fuselage 2 by the occupants or from outside the fuselage 2 by rescuers.

In greater detail, the emergency exit 5b comprises:
a pair of strip-like elements 15 (FIGS. 4 and 5), which normally engage respective seats 16 defined by the seal 12; and
a removal element 17 connected to the elements 15 and that can be operated with a pull-out action to remove these elements 15 from the respective seats 16.

The elements 15 also have a closed-loop shape corresponding to that of the seal 12.

Figure 5:
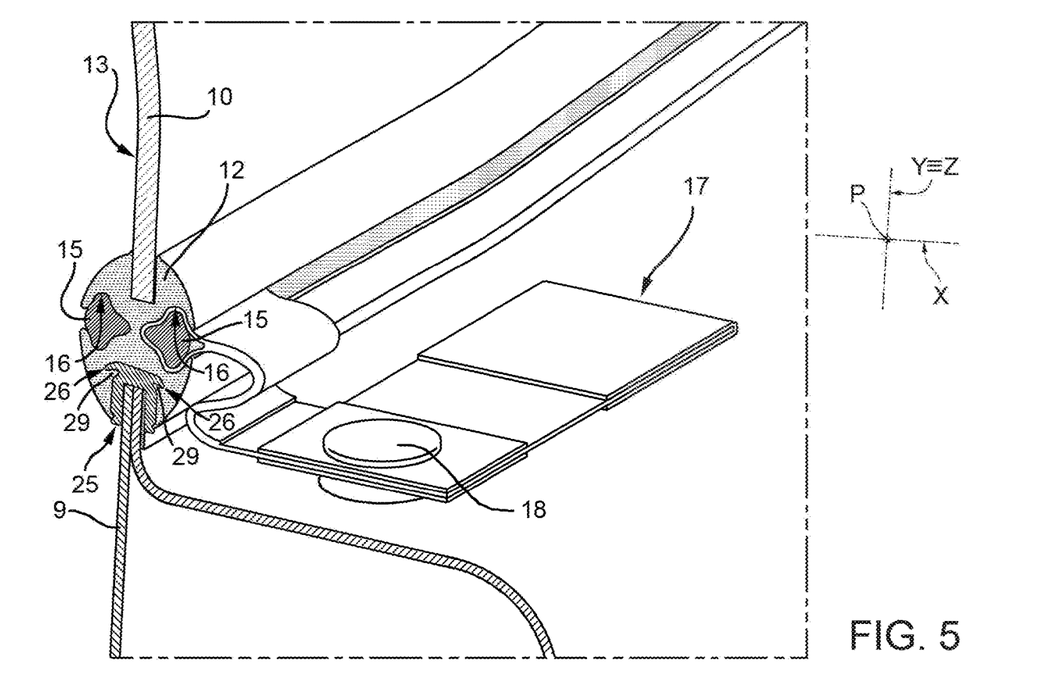
FIG. 5 shows a perspective view, on a particularly enlarged scale, of the emergency exit in FIG. 1, with parts removed for clarity.

In the embodiment in FIG. 5, the removal element 17 is a nylon cord 18 fixed in a removable manner to a fixed part 19 of the fuselage 2 adjacent to the wall 9 and accessible from inside the fuselage 2.

Figure 6:
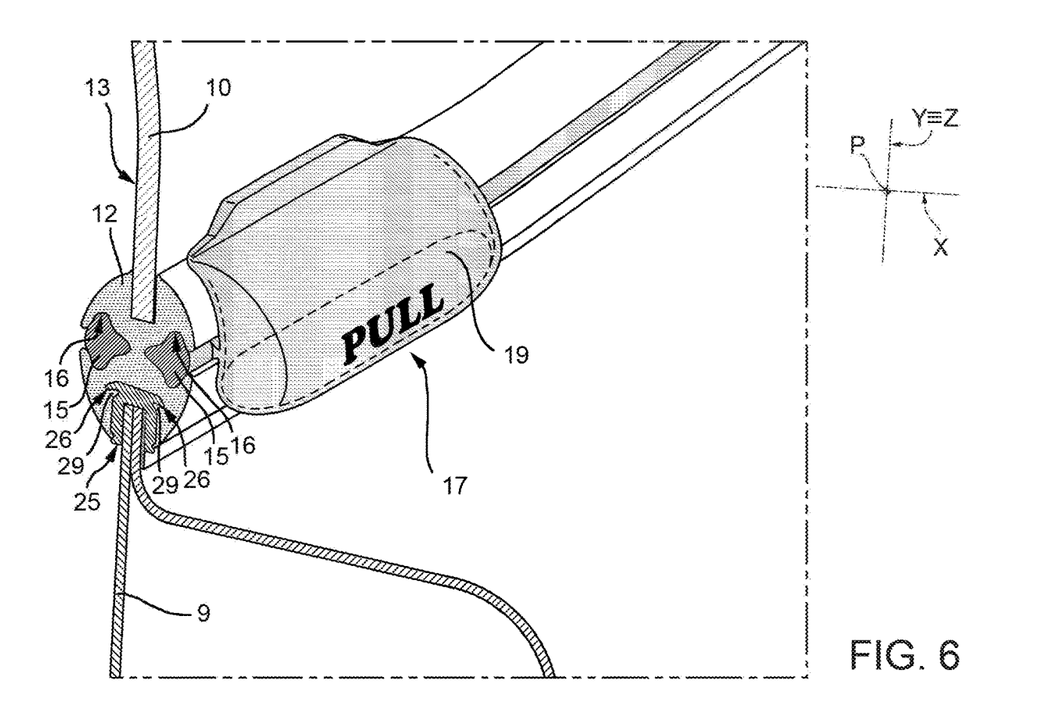
FIG. 6 shows a perspective view, on a particularly enlarged scale, of a further embodiment of the emergency exit in FIGS. 1 to 5.

In the embodiment in FIG. 6, the removal element 17 is a handle.

The seal 12 is transformable, via elastic deformation, between:
a first configuration, used in normal operating conditions of the helicopter 1, in which the seats 16 are engaged by the elements 15 and in which it prevents removal of the part 10 from the wall 9 even following application of a force higher than the threshold value; and
a second configuration used in emergency situations, in which the seats 16 have been freed of the elements 15 and in which it enables removal of the part 10 from the wall 9 following application of a force lower than the threshold value.

More specifically, when the seal 12 is in the first configuration, the elements 15 engaging the respective seats 16 cause an increase in the resistive section of the seal 12. In fact, this resistive section is equal to the sum of the sections of the seal 12 and the sections of the elements 15.

Conversely, when the seal 12 is in the second configuration and the seats 16 are free, the resistive section of the seal 12 is smaller with respect to the first configuration and equal to just the section of the seal 12.

The removal of the part 10 from the wall 9 in the event of an emergency takes place in two steps:
first, the removal element 17 is operated so as to remove the elements 15 from the seal 12 and transform the latter from the first to the second configuration; and
then, a load lower than the threshold value is applied on a corner of the part 10, so as to remove the latter, together with the seal 12, from the wall 9.

In the case shown, the seal 12 and the strip elements 15 are made of rubber.

Advantageously, the emergency exit 5b comprises an insert 25 interposed between the seal 12 and the wall 9; the insert 25 comprises, in turn:
a pair of teeth 26 engaging respective recesses 27 defined by the seal 12; and
a pair of recesses 28 engaged by respective teeth 29, defined by the seal 12, when the seal 12 keeps, in use, the part 10 constrained to wall 9.

The insert 25 is connected to the seal 12 through the positive connection defined by teeth 26 engaging recesses 27 and by recesses 28 being engaged by teeth 29.

The insert 25 is connected to the wall 9 by a glue joint.

Referring to FIGS. 2 to 5, the seal 12 also has:
an axis Y orthogonal to the path P and parallel to the plane on which the part 10 and the wall 9 lie; and
an axis X orthogonal to the path P and to the Y-axis.

The seal 12 is symmetrical with respect to the Y-axis.

In greater detail, the seal 12 comprises:
a central portion 30; and
two pairs of appendages 31 and 32 protruding in a cantilever fashion from the central portion 30 and arranged on respective opposite sides of the central portion 30 with reference to the Y-axis.

The appendages 31 and 32 of each pair extend in a cantilever fashion from the central portion 30 on respective mutually opposite sides with reference to the X-axis.

The seats 16 are arranged on respective mutually opposite sides of the seal 12 with respect to the X-axis.

Each seat 16 is delimited by the central portion 30 and by an associated pair of appendages 31 and 32 opposite to each other and parallel to the Y-axis.

Each seat 16 is open parallel to the X-axis on the opposite side to the central portion 30.

The profile of each seat 16 also comprises three cavities 33 with a substantially semicircular section orthogonal to the path P and with one delimited by related appendage 31, another by appendage 32 and the other by the main portion 30.

The profile of each seat 16 also comprises connecting sections interposed between the cavities 33 and joining the end cavities 33 with the respective appendages 31 and 32.

Each element 15 comprises a plurality of protuberances 35 engaging respective cavities 33.

In particular, the protuberances 35 have substantially semicircular profiles connecting them to one another.

The seal 12 also comprises:
a seat 40 inside which the part 10 is glued; and
a seat 41, opposite to seat 40 along direction Y, and which can be coupled with the insert 25.

The seats 40 and 41 are open on respective opposite sides with respect to the central portion 30.

Seat 40 is delimited by:
a wall 45 lying on a plane orthogonal to direction Y; and
a pair of walls 46, which extend from wall 45 on the side opposite to the central portion 30.

In particular, the walls 46 comprise:
respective main segments 47 protruding in a cantilever fashion from the wall 45, parallel to each other and lying on respective planes orthogonal to the X-axis; and
respective mutually converging end segments 48 continuing from segments 47 on the part opposite to the central portion 30.

Seat 41 has a shape corresponding to the shape of the insert 25.

In greater detail, the seat 41 basically comprises:
a head portion 51 arranged on the side of the central portion 30 and delimited by the central portion 30; and
a pair of walls 52 spaced from each other and protruding in a cantilever fashion from the head portion 51 on the opposite side to the central portion 30.

The head portion 51 comprises:
a wall 49, lying on a plane orthogonal to direction Y and delimiting the central portion 30;
recesses 27 that are arranged laterally to the wall 53; and
teeth 29, which protrude in direction Y from the respective recesses 27.

In particular, the teeth 29 are arranged on the opposite side of the respective recesses 27 with respect to the wall 53.

Furthermore, the teeth 29 are contiguous with the respective recesses 27 in the case shown.

The walls 52 comprise, proceeding from the head portion 51 on the side opposite to the central portion 30:
respective segments 53 contiguous with respective teeth 29, parallel to each other and lying on respective planes orthogonal to the X-axis; and
respective end segments 54, mutually converging and continuing from segments 53 on the side opposite to the central portion 30.

The insert 25 has an axis of symmetry Z, which coincides with the Y-axis when the insert 30 is coupled with the seal 12.

In greater detail, the insert 25 comprises:
a head portion 60 extending mainly orthogonal to the Z-axis, and defining the teeth 26 and the recesses 28; and
a tubular portion 61 extending parallel to the Z-axis and defining a cylindrical seat 62 inside which an end of the wall 9 is glued.

More specifically, the head portion 60 comprises, in turn:
a wall 65 lying on a plane orthogonal to the Z-axis;
teeth 26, which define respective opposite ends of the wall 65 between them and are arranged laterally to direction Z; and
recesses 28 which are arranged on opposite sides of the respective teeth 26 with respect to the wall 65 and are partially delimited by the profile of the respective teeth 26.

In particular, the teeth 26 are interposed between the related recesses 28 and the wall 65.

In addition, the teeth 26 are contiguous with the respective recesses 28 in the case shown.

In the case shown, the insert 25 is made of rubber.

The operation of the emergency exits 5a and 5b is identical.

Therefore, only the operation of emergency exits 5b is described hereinafter.

Figure 2:
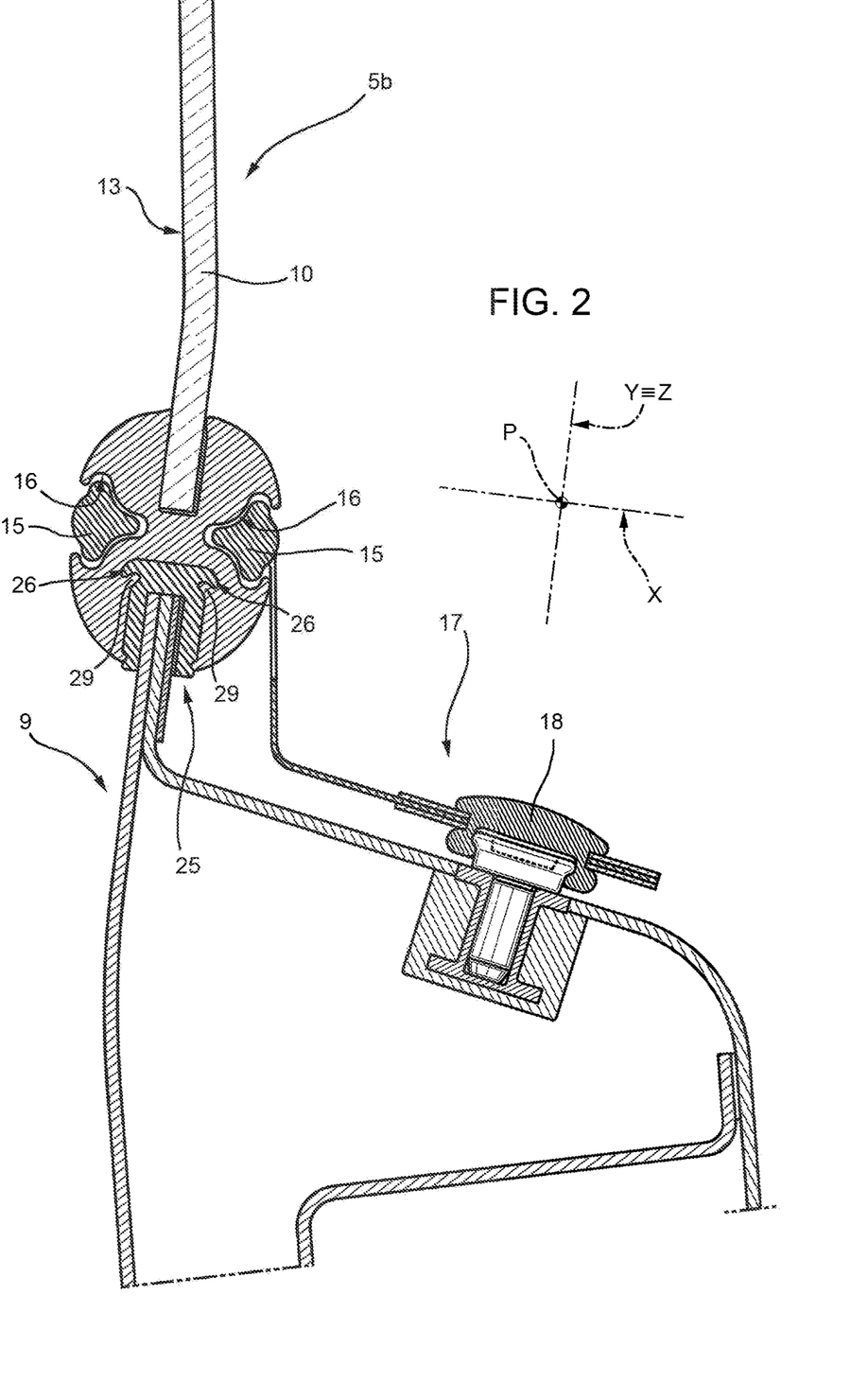
FIG. 2 is a section along line II-II of FIG. 1.
Figure 3:
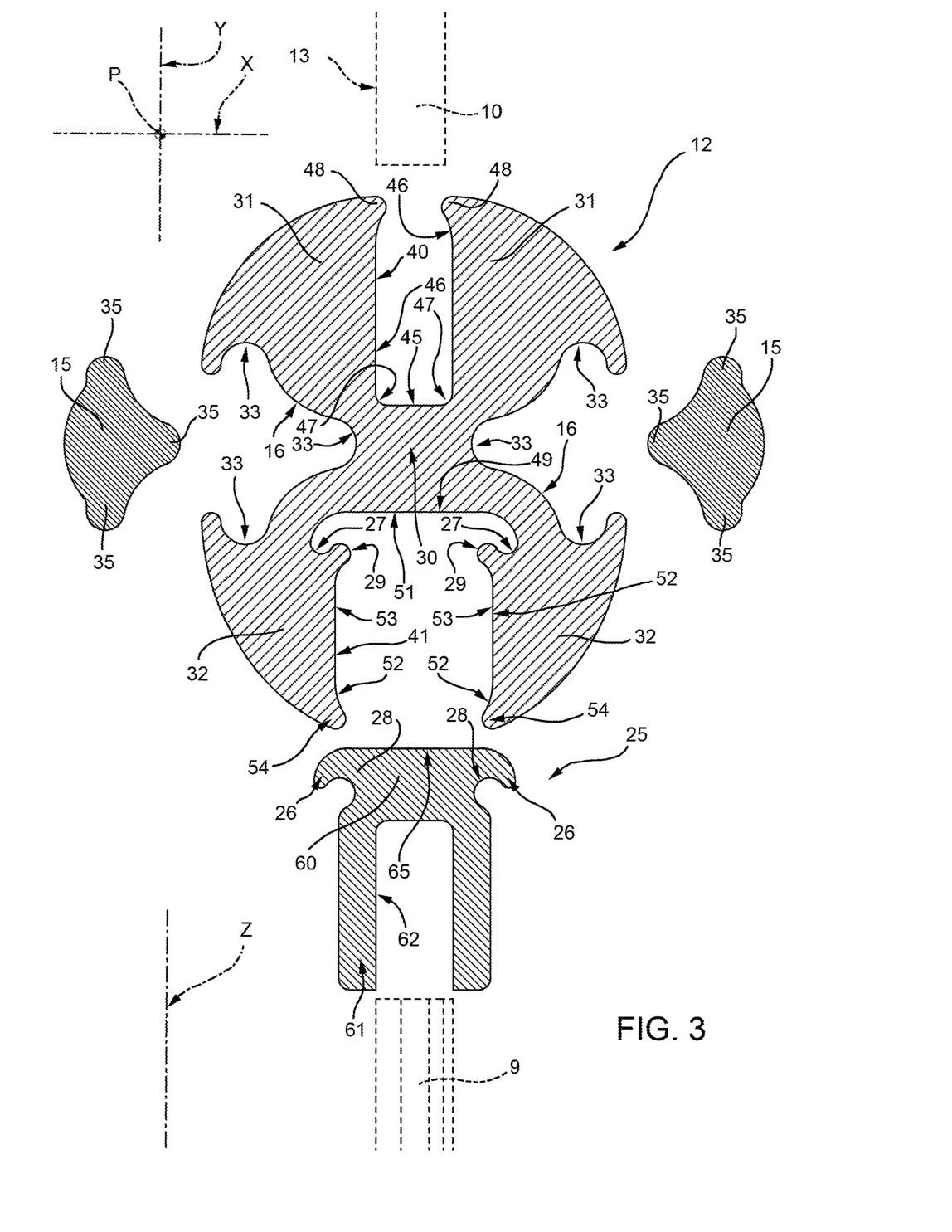
FIG. 3 is an exploded view, on a still further enlarged scale, of some details of FIG. 2.
Figure 4:
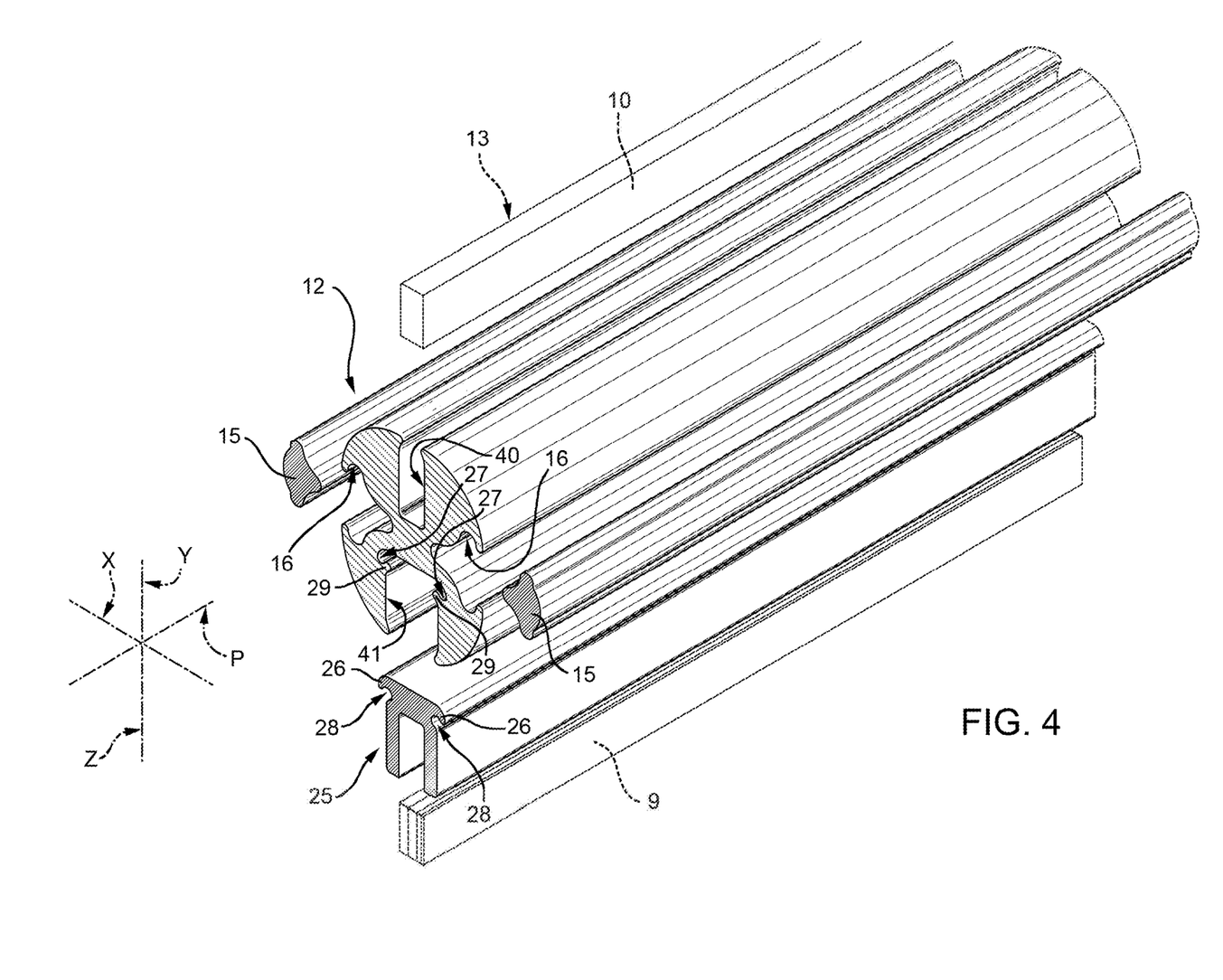
FIG. 4 shows a perspective view of some details of FIG. 2.

Operation of the emergency exits 5b is described below in detail, starting from a normal operating condition of the helicopter 1, in which the seal 12 is in the first configuration (FIG. 2).

In this normal operating condition of the helicopter 1, the elements 15 engage the seats 16, and the seal 12 keeps the part 10 connected by means of the insert 25.

In consequence, the seal 12 holds the part 10 in a fixed position with respect to the wall 9 even in the event of a force higher than the threshold value being applied on the part 10, whether from inside the fuselage 2 or due to aerodynamic loads associated with the manoeuvres of the helicopter 1.

In an emergency, the part 10 is removed from the wall 9 so as to leave the opening 6 free. The occupants of the fuselage 2 can thus climb through the opening 6 freed from the part 10. In an entirely similar manner, the part 10 can be removed from outside the helicopter 1 by rescue workers.

The removal of the removable part 10 from the wall 9 takes place in two steps as described below.

First of all, the removal element 17 is operated so as to remove the elements 15 from the related seats 16 of the seal 12 and transform the latter from the first to the second configuration.

The removal of one of elements 15 causes the reduction in the resistive section of the seal 12.

After this, it is sufficient to apply a load lower than the threshold value on a corner of the part 10 to complete removal of the part 10.

This load causes the force of friction existing between the teeth 26 of the insert 25 and the respective recesses 27 of the seal 12, and between the teeth 29 of the seal 12 and the respective recesses 28 of the insert 25, to be overcome.

In consequence, the seal 12 and the part 10 separate from the insert 25, which remains glued to the wall 9.

From an examination of the characteristics of the emergency exit 5a and 5b according to the present invention, the advantages that can be achieved therewith are evident.

In particular, the emergency exit 5a and 5b comprises an insert connected to the seal 12, in normal helicopter operating conditions, through the positive connection defined by the teeth 26 of the insert 25 and the respective recesses 27 of the seal 12, and by the teeth 29 of the seal 12 and the respective recesses 28 of the insert 25.

In consequence, the force that opposes removal of the part 10 and the seal 12 from the wall 9 is the friction existing between the teeth 26 of the insert 25 and the respective recesses 27 of the seal 12, and between the teeth 29 of the seal 12 and the respective recesses 28 of the insert 25.

In this way, unlike the known solutions discussed in the introductory part of this description, the emergency exit 5a and 5b, does not require any glue joint to be broken to enable pulling the removable part 10 away from the wall 9.

As a consequence, the amount of force necessary to remove the removable part 10 is controllable with high precision and repeatability.

Furthermore, this amount of force is substantially independent from the operations of connecting the seal 12 to the wall 9 by means of the insert 25.

Moreover, the applicant has observed that the positive connection between the insert 25 and the seal 12 enables ensuring that the part 10 remains connected to the wall 9 even in the presence of significant aerodynamic loads when the helicopter 1 is in normal operating conditions and the seal 12 is in the first configuration.

Conversely, in an emergency situation and with the seal 12 arranged in the second configuration, the amount of force necessary to remove the part 10 is particularly low with respect to the maximum value prescribed by regulations, with evident advantages in terms of safety.

This basically depends on the fact that the recesses 27 further reduce the resistive section of the seal 12 arranged in the second configuration.

The seal 12 is glued to the part 10 in a continuous manner and the insert 25 is glued to the wall 9 in a continuous manner. In consequence, the emergency exit 5a and 5b can be made in a particularly easy and inexpensive manner, without requiring the use of qualified technical personnel and/or special equipment.

Due to the ease of installation on the wall 9, the seal can also be applied to the emergency exits 5a and 5b of helicopters that are already manufactured and in service in a simple and inexpensive manner.

Furthermore, since the force necessary to remove the removable part 10 only depends on the friction between seal 12 and insert 25, it is possible to ensure that this force is less than the threshold value and substantially constant over the entire temperature range from −40° C. to 50° C. prescribed by certification standards.

Contrariwise, the glue joints provided by the known solutions discussed in the introductory part of this description have mechanical properties that vary significantly with temperature, also causing substantial variations in the amount of force necessary to remove the removable part.

Finally, the emergency exit 5a and 5b is particularly economical and does not introduce additional weight with respect to known solutions.

Finally, it is clear that modifications and variants can be made regarding the emergency exit 5a and 5b described and illustrated herein without departing from the scope defined by the claims.

In particular, the positive connection between the insert 25 and the seal 12 could be made through:
- a single tooth 26 carried by the insert 25 and engaging a single recess 27 carried by the seal 12; or
- a single tooth 29 carried by the seal 12 engaging a single recess 28 of the insert 25.

The invention claimed is:

1. A helicopter (1) comprising:
a fuselage (2); and
at least one emergency exit (5a, 5b);
said emergency exit (5a, 5b) for a helicopter (1), comprising:
a wall (9) defining an opening (6), made integrally with said fuselage (2), or directly or indirectly connected to the fuselage (2);
a removable part (10) engaging said opening (6) in a removable manner; and
a seal (12) interposed between said wall (9) and said removable part (10);
said seal (12) being elastically transformable between:
a first configuration, in which it prevents, in use, the removal of said removable part (10) from said wall (9) following application of a predetermined load on said removable part (10); and
a second configuration, in which it allows, in use, removal of said removable part (10) from said wall (9) following application of said predetermined load on said removable part (10);
characterized in that said emergency exit (5a, 5b) further comprises an insert (25) interposed between said seal (12) and said wall (9);
said insert (25) comprising at least one first tooth (26) engaging a first recess (27) with a shape corresponding to said first tooth (26) and defined by said seal (12), when said seal (12) keeps, in use, said removable part (10) constrained to said wall (9);
said insert (25) further comprising at least one second recess (28) engaged by a second tooth (29) with a shape corresponding to said second recess (28) and defined by said seal (12), when said seal (12) keeps, in use, said removable part (10) constrained to said wall (9);
said insert (25) comprising:
- a hollow tubular portion (61) engaged in a fixed manner by said wall (9); and
- an axial end portion (60) defining said first tooth (26) and said second recess (29);

said insert (25) being made of an elastically deformable material.

2. The helicopter according to claim 1, characterized in that said second recess (28) and said first tooth (26) have respective mutually contiguous profiles; and/or in that said first recess (27) of said seal (12) and said second tooth (29) have respective mutually contiguous profiles.

3. The helicopter according to claim 1, characterized in that said insert (25) comprises a pair of said first teeth (26) and corresponding said second recesses (28) arranged on respective mutually opposite sides with respect to a first axis (Z) of symmetry, which is transversal to a longitudinal direction of extension of the insert (25).

4. The helicopter according to claim 3, characterized in that said seal (12) comprises a pair of said second teeth (29) and corresponding said first recesses (27) arranged on respective mutually opposite sides with respect to a second axis (Y) of symmetry, which is transversal to a main direction of extension (P) of the seal (12);
said first and second axes (Y, Z) being coincident when said seal (12) keeps, in use, said removable part (10) constrained to said wall (9).

5. The helicopter according to claim 1, characterized in that said tubular portion (61) and said wall (9) are glued to each other.

6. The helicopter according to claim 5, characterized in that said tubular portion (61) and said wall (9) are glued to each other in a continuous manner.

7. The helicopter according to claim 1, characterized in that said seal (12) comprises a first seat (40) engaged in a fixed manner by said removable part (10), and a second seat (41) engageable by said insert (25) and arranged on the opposite side to said first seat (40);
said second seat (41) defining said at least one first recess (27) and said at least one second tooth (29).

8. The helicopter according to claim 1, characterized in that it comprises at least one strip element (15) housed in a releasable manner in a third seat (16) of said seal (12) and selectively extractable from said third seat (16) so as cause the elastic transformation of said seal (12) from said first configuration to said second configuration.

9. The helicopter (1) according to claim 1, characterized in that it comprises:
- a first said emergency exit (5a) designed to allow, in use, the emergency escape of the occupants of a cockpit (7); and
- a second said emergency exit (5b) designed to allow, in use, the emergency escape of the passengers occupying said fuselage (2).

* * * * *